United States Patent [19]
Larsen

[11] Patent Number: 5,333,339
[45] Date of Patent: Aug. 2, 1994

[54] DOCK LEVELER WITH WHEEL BARRIER

[75] Inventor: Kurt K. Larsen, Pell City, Ala.

[73] Assignee: Blue Giant Equipment Corporation, Pell City, Ala.

[21] Appl. No.: 5,984

[22] Filed: Jan. 19, 1993

[51] Int. Cl.⁵ .............................................. E01D 1/00
[52] U.S. Cl. ..................................................... 14/71.1
[58] Field of Search ...................... 14/69.5, 71.1, 71.3, 14/71.7

[56] References Cited

U.S. PATENT DOCUMENTS

| | | | |
|---|---|---|---|
| 4,325,155 | 4/1982 | Alten | 14/71.1 |
| 4,920,598 | 5/1990 | Hahn | 14/71.1 |
| 5,157,801 | 10/1992 | Alexander | 14/71.3 |

FOREIGN PATENT DOCUMENTS 3036305  5/1982  Fed. Rep. of Germany ....... 14/71.7

*Primary Examiner*—Ramon S. Britts
*Assistant Examiner*—James A. Lisehora
*Attorney, Agent, or Firm*—Veal & Associates

[57] ABSTRACT

Apparatus for use in a loading dock area to prevent any wheeled apparatus from accidentally falling off the loading dock. The leveler includes a ramp for supporting a load between a truck and a platform and also used to actuate a barrier, the barrier is operatively connected to the ramp through a plurality of links. The invention operates through the position of the ramp in relation to the platform top surface. When the dock leveler is in the stored position the ramp is at a 90° angle to the dock leveler top surface. In this position the linkage has rotated the stop such that it protrudes above the surface of the deck. Thus forming the barrier so that no wheeled vehicles could accidentally roll off the end of the dock. When the dock leveler is below a level position, the linkage no longer acts to supports the barrier, so that the barrier falls back to the surface of the dock leveler, no longer forming a barrier. When the ramp is extended to a somewhat parallel position with the dock leveler top surface the linkage again no longer supports the barrier allowing it to fall back to the surface of the dock leveler.

20 Claims, 2 Drawing Sheets

DOCK LEVELER WITH WHEEL BARRIER

FIELD OF THE INVENTION

The present invention relates to dock leveler assemblies and further relates to a means to produce a barrier to prevent wheeled apparatus from falling off the dock and preventing wheeled apparatus from accidentally striking a door. More particularly the present invention relates to such devices which may be actuated by the position of a loading ramp.

BACKGROUND OF THE INVENTION

Devices are known in the art which purport to create a barrier for use with dock levelers. Typically the dock levelers utilize a lip pivotally attached to the outer portion of the ramp. The pivotal axis of the lip is located such that the rear portion of the lip will extend above the ramp surface, thus forming a barrier. Such a device, however, doesn't provide for the situation in which a truck to be tail loaded is lower than the dock. Whereby the ramp would extend downward and the rear portion of the lip is in an extended cantilevered position, thus obstructing the loading operations.

Another device is known in the art which purports to create a barrier for use with dock levelers. This device consists of a lip, hingedly connected to the front edge of a ramp, which automatically assumes a depending storage position when the ramp is in the stored position. When the ramp and lip are in a stored position, a substantial peripheral portion of the lip projects above the exposed ramp surface thus forming a barrier. The prior art thus cannot also be used to protect a closed overhead door opening which is typically located on a dock because of the prior arts location of the barrier at the end of the ramp. Further the prior art cannot be adapted to retrofit onto other dock levelers. Still further the prior art can only be used when the positioning is by hydraulic means whereas the present invention is compatible with either mechanical or hydraulic.

SUMMARY OF THE INVENTION

It is an object of the present invention to provide a barrier means for a dock leveler assembly.

Another object of the invention is to provide a barrier means actuated by a loading ramp for a dock leveler assembly.

Still another object of the invention is to provide a barrier means for a dock leveler which can be used to also protect an overhead doorway.

Yet another object of the invention is to provide a barrier means which can be utilized with an existing dock leveler assembly.

The present invention accomplishes these objects as well as other novel advantages through the unique combination of a plurality of component parts, one of the most significant of which is the use of links located between the ramp and barrier means to actuate the barrier means under certain conditions, Numerous other features of the novel construction will become apparent from a study of the appended drawings and the description of the preferred embodiments.

BRIEF DESCRIPTION OF THE DRAWINGS

Apparatus embodying features of my invention are disclosed in the accompanying figures which form a portion of this disclosure and wherein:

FIG, 1 is a perspective view of the present invention in a typical use;

Figure 1:
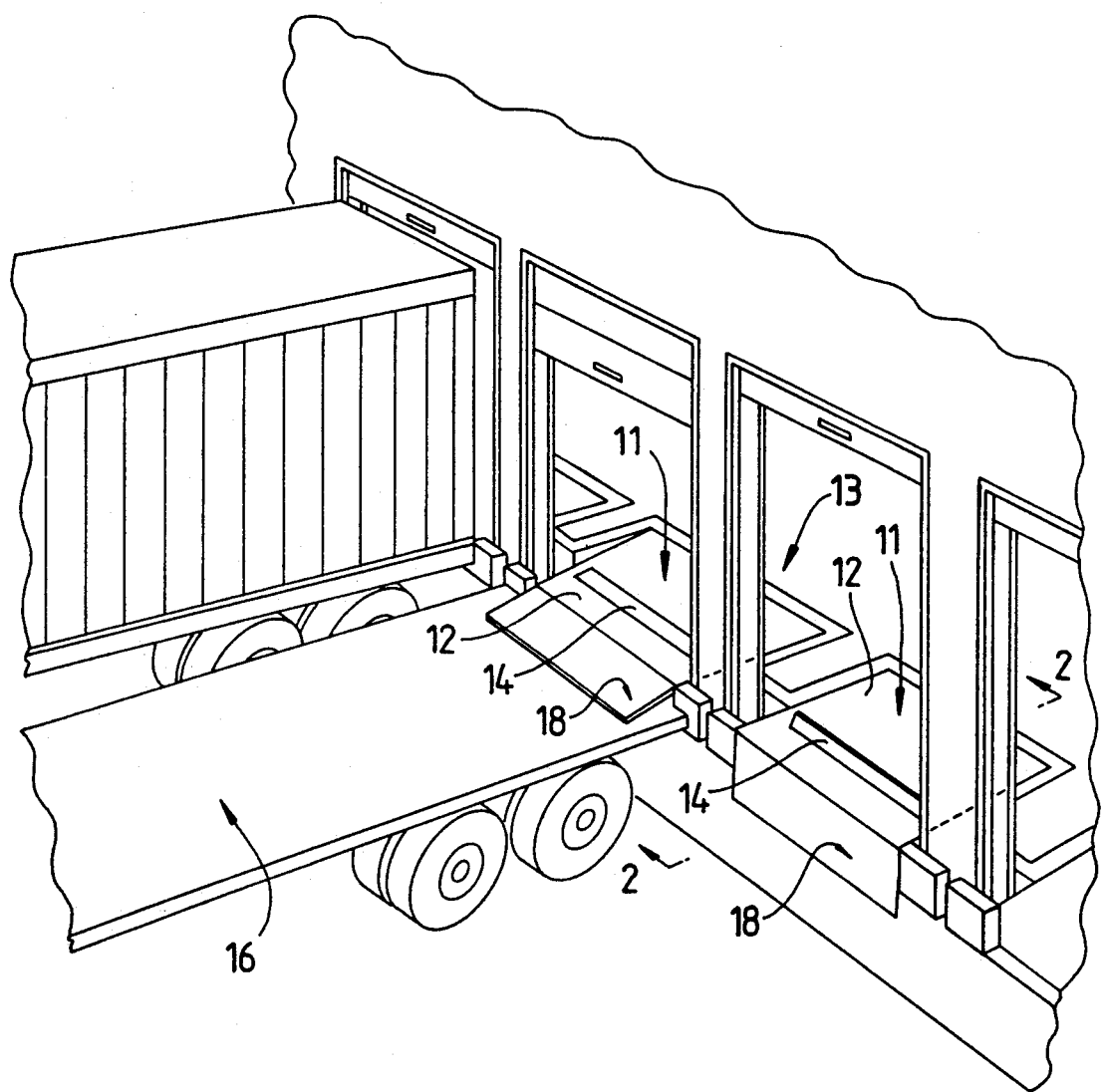
Figure 3:
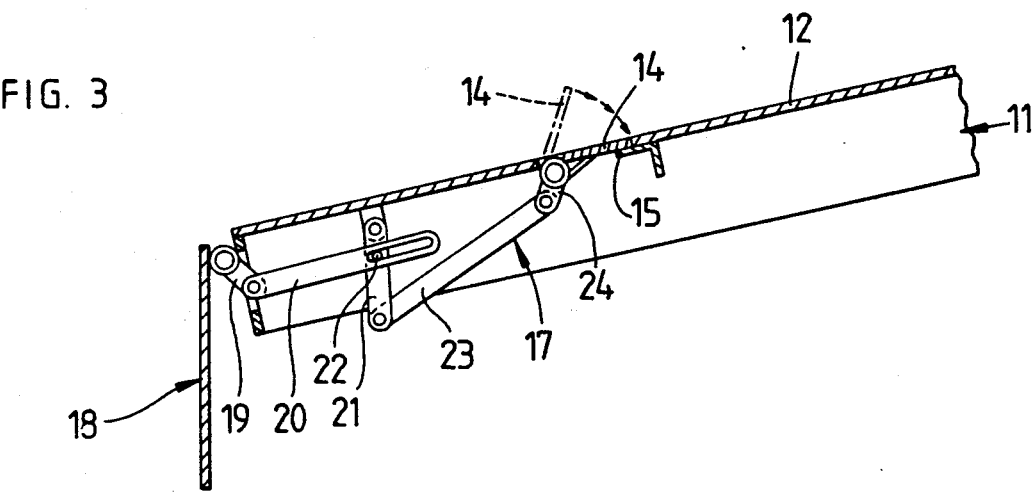
Figure 4:
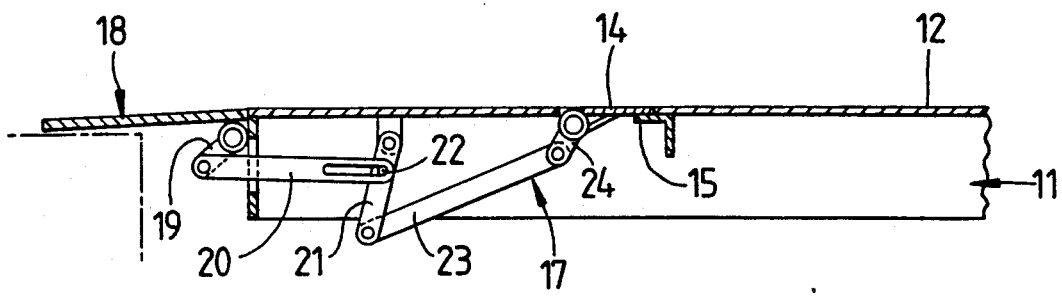

FIG, 2 is a sectional view taken along line 2—2 of FIG. 1 of the present invention with the barrier in a raised position while the dock leveler is in the stored position;

FIG. 3 is a sectional view with the barrier in a lowered position, the dock leveler in a below level position and the ramp in a declined position; and FIG. 4 is a sectional view with the barrier in the lowered position when the ramp is substantially parallel with the dock leveler platform.

DESCRIPTION OF THE PREFERRED EMBODIMENTS

Referring to the drawings for a clearer understanding of the invention it may be seen in FIGS, 1-4 that a first embodiment of the apparatus includes a dock leveler 11 which defines a platform 12 hingedly attached to a dock 13. The dock leveler is used to form an adjustable bridge between a dock 13 and a truck or other wheeled apparatus 16, to support loads for the flow of goods across the platform 2 of the dock leveler.

Figure 2:
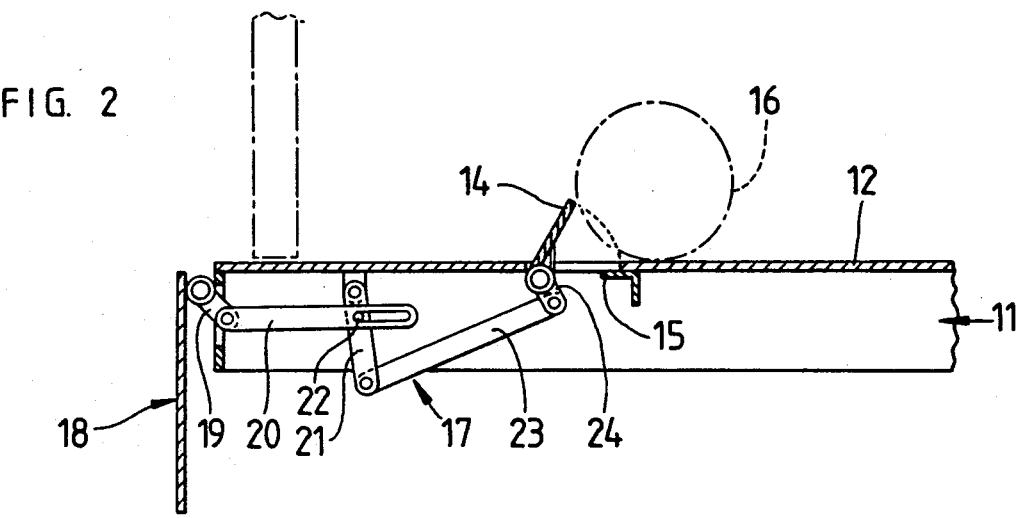

The dock leveler 11 has a barrier 14, as shown in FIGS. 1-4, on its platform 12 to prohibit wheeled apparatuses from accidentally rolling across the dock leveler and falling to the ground below and to prevent wheeled apparatuses from accidentally striking a closed overhead door 15 at the end of the platform 12 distal the dock 13. The barrier 14 is rectilinear in shape and substantially extends across the width of the dock leveler 11. As shown in FIG. 2, the barrier 14 is spaced from the end of platform 12 distal the dock 13 a sufficient distance to allow the lower edge of the overhead door 15 to rest on platform 12 intermediate the barrier 14 and the end of platform 12 distal the dock 13 when the overhead door is closed. Actuation of the barrier 14 is accomplished through the use of a plurality of links 17 as shown in FIG. 2-4 which are dependent upon the angle between the platform 12 of the dock leveler and a ramp 18 as shown in FIGS. 2-4. The ramp 18 is a planar member hingedly connected to the outer portion of the dock leveler 11.

The actuation of the barrier 14 by the links 17 which depend from the ramp 18 is hereinafter described. FIG. 2 shows the barrier 14 in a raised position while the dock leveler 11 is in the stored position, which results in an approximately 90° angle between the dock leveler platform 12 and the ramp 18. In this position the links have rotated the barrier 14 such that it protrudes above and across the dock leveler platform 12.

FIG. 3 illustrates the barrier 14 in a lowered position while the dock leveler 11 is in the below level position. This position causes the ramp 18 to rotate approximately 105 degrees relative to the dock leveler platform 12. The link system 17 no longer acts upon the barrier 14 thus the weight of the barrier causes it to return to a parallel configuration with the dock leveler platform 12, resting on a lip 15. The barrier 14 thus no longer acts as such and allows the unobstructed loading/unloading of a truck or other carrier 17.

FIG. 4 illustrates the barrier in the lowered position when the ramp 18 is substantially parallel with the dock leveler platform 12. In this position, the links have rotated the barrier 14 such that it remains parallel with the dock leveler platform 12, such that the barrier 14 does not present a barrier to the movement of wheeled apparatus 16 such as materials handling equipment.

FIGS. 2–4 illustrates the linkage system 17. The linkage system is comprised of a first crank arm 19 which is connected between the ramp 18 and a first link 20. The first link 20 is an elongated structure with a slotted groove. The first link 20 connects the first crank arm 19 to a second link 21 through a pin 22. The second link 21 is an elongated structure hingedly attached to the bottom of the dock leveler 11. The pin 22 is carried by the second link 21 and inserted in a slot in the first link 20.

The second link 22 is hingedly dependent from the platform 22 and hingedly connected to a third link 23 which is an elongated structure. The third link 23 connects the second link 21 to a second crank arm 24 which in turn is connected to the barrier 14.

The barrier 14 can be structured so as to fit with an opening of the platform 12 of the dock leveler or either to rest upon the surface of the platform 12.

To those familiar in the art, the present invention presents a marked improvement over current methods to create a barrier upon a dock leveler.

While I have shown my invention in various forms, it will be obvious to those skilled in the art that it is not so limited but is susceptible of various changes and modifications without departing from the spirit thereof.

What I claim is:

1. A dock leveler assembly comprising:
(a) a platform, having a lower surface, an inner edge and an outer edge, said platform being hingedly attached along said inner edge to a building floor and selectively movable between a level position and an inclined position;
(b) barrier means, positioned on said platform near said outer edge and spaced sufficiently therefrom to allow a closed overhead door to rest upon said platform intermediate said barrier means and said outer edge of said platform, for preventing inadvertent rolling of wheeled vehicles beyond said barrier means toward said outer edge, said barrier means being movable between a raised position and a lowered position;
(c) a ramp hingedly attached to said outer edge of said platform, said ramp being selectively movable between a pendent stored position and an operative position substantially parallel with said platform; and
(d) means for providing operative connection between said ramp and said barrier means, such that said barrier means is responsive both to the position of said ramp and the position of said platform.

2. A dock leveler assembly as defined in claim 1 wherein said barrier means comprises a rectilinear plate extending substantially across the width of said platform, said rectilinear plate being hingedly attached at an edge thereof proximal said outer edge of said platform such that said plate can be raised to create a barrier.

3. A dock leveler assembly as defined in claim 2, wherein said means for providing operative connection comprises:
(a) a first crank arm, having a first end and a second end, said first end being rigidly connected to said ramp at an end thereof proximal said platform;
(b) a first elongated link, having a first end and a second end, said first end being pivotally attached to said second end of said first crank arm, said second end defining a slot positioned along the longitudinal axis of said first link;
(c) a second elongated link, having a first end and a second end, said second link further having a pin affixed thereto proximal said first end, said first end being hingedly attached to the lower surface of said platform, and said pin protruding through said slot of said first link, forming a slidable connection between said first link and said second link;
(d) a third elongated link having a first end and a second end, said first end being pivotally attached to said second end of said second link; and
(e) a second crank arm, having a first end and a second end, said first end being pivotally attached to said second end of said third link, and said second end being rigidly connected to said plate.

4. A dock leveler assembly as defined in claim 2 wherein said plate is made of steel.

5. A dock leveler assembly as defined in claim 1 wherein said barrier means comprises a plate to be lowered to allow a wheeled vehicle to cross over said plate or raised to create a barrier to a wheeled vehicle and a hinge connecting said plate to said dock leveler allowing pivotal movement of said plate.

6. An improvement for a dock leveler assembly to be used with a loading dock having an overhead door wherein said dock leveler assembly includes a platform affixed to said loading dock and movable to preselected heights and a ramp hingedly affixed to said platform at an end thereof distal said loading dock, said ramp being movable between a pendant stored position and an operative position substantially parallel to said platform, thereby defining a variable angle between said ramp and said platform, wherein the improvement comprises a barrier means, movable between a raised and lowered position, for preventing movement of a wheeled apparatus across said platform when in said raised position or for allowing such movement across said platform when in a lowered position, hingedly attached to said platform and operatively attached to a linkage system which controls the raising and lowering of said barrier means responsive to the position of said platform and ramp, said barrier means being spaced from said end of said platform defining a door receiving region therebetween, such that said overhead door abuts said door receiving region of said platform when said door is closed.

7. The improvement as defined in claim 6 wherein said barrier means comprises a plate extending substantially across the width of said platform, and a hinge connected between said plate and said platform to allow pivotal movement of the plate.

8. The improvement as defined in claim 7 wherein said plate is a steel plate.

9. The improvement as defined in claim 6 wherein said linkage system comprises a set of links interconnected to actuate said barrier means responsive to the position of said ramp means.

10. The improvement as described in claim 6 wherein said barrier means comprises a plate to prevent a wheeled apparatus from inadvertently being allowed to roll off the end of said platform.

11. The improvement as described in claim 6 wherein said barrier means includes a plate arranged such that the barrier means would prevent a wheeled apparatus from accidentally striking a door.

12. The improvement as defined in claim 6 wherein said barrier means comprises a plate movable between a raised and lowered position contingent upon the position of said ramp.

13. The improvement as defined in claim 6 wherein said linkage system comprises:
(a) a first crank arm connected to said ramp;

(b) a second link, hingedly depending from the lower surface of said platform, said second link having a pin affixed thereto;

(c) a first link, pivotally attached at a first end thereof to said first crank arm, said first link having a slot in a second end of said link, said slot being slidably mounted on said pin of said second link;

(d) a third link, pivotally attached to said second link;

(e) a second crank arm, pivotally attached to said third link and rigidly attached to said barrier means, such that the position of said barrier means is dependent upon the angle between said ramp and said platform.

14. The improvement as defined in claim 6 wherein said linkage system comprises:

(a) a first crank arm, having a first end and a second end, said first end being rigidly connected to said ramp at an end thereof proximal said platform;

(b) a first elongated link, having a first end and a second end, said first end being pivotally attached to said second end of said first crank arm, said second end defining a slot positioned along the longitudinal axis of said first link;

(c) a second elongated link, having a first end and a second end, said second link further having a pin affixed thereto proximal said first end, said first end being hingedly attached to said platform, and said pin protruding through said slot of said first link, forming a slidable connection between said first link and said second link;

(d) a third elongated link having a first end and a second end, said first end being pivotally attached to said second end of said second link; and (e) a second crank arm, having a first end and a second end, said first end being pivotally attached to said second end of said third link, and said second end being rigidly connected to said barrier means.

15. A dock leveler assembly comprising:

(a) a platform, attached at an end thereof to a building floor, said platform being movable between a level position and an inclined position;

(b) ramp means, for supporting a load between a truck and said platform, said ramp means being movable between a pendant stored position and an operative position extending outwardly from said platform;

(c) barrier means, operatively connected to said ramp means, said barrier means selectively movable between a raised position and a lowered position in accordance with the position of said ramp means and said platform;

(d) a first crank arm, having a first end and a second end, said first end being rigidly connected to said ramp means;

(e) a first elongated link, having a first end and a second end, said first end being pivotally attached to said second end of said first crank arm, said second end defining a slot positioned along the longitudinal axis of said first link;

(f) a second elongated link, having a first end and a second end, said second link further having a pin affixed thereto proximal said first end, said first end being hingedly attached to said platform, and said pin protruding through said slot of said first link, forming a slidable connection between said first link and said second link;

(g) a third link having a first end and a second end, said first end being pivotally attached to said second end of said second link; and (h) a second crank arm, having a first end and a second end, said first end being pivotally attached to said second end of said third link and said second end being rigidly connected to said barrier means, such that said first, second and third links cooperatively position said barrier means responsive to the positions of said ramp means and said platform.

16. A dock leveler assembly as defined in claim 15 wherein said ramp means allows movement of a load between a dock leveler and a truck and comprises a plate which is hingedly connected to said dock leveler and rigidly secured to a said first crank arm.

17. A dock leveler assembly as defined in claim 15, wherein said barrier means comprises a rectilinear plate, said plate extending substantially across the width of said platform, said plate having a hinged edge proximal said end of said platform distal said building floor, said hinged edge being connected to said platform, and a free edge opposite said hinged edge, such that said free edge may be raised to create a barrier to a wheeled vehicle or lowered to allow movement of a wheeled vehicle across said plate.

18. An improvement for a dock leveler assembly to be used with a loading dock having an overhead door wherein said dock leveler assembly includes a platform affixed to said loading dock and movable to preselected heights and a ramp hingedly affixed to said platform at an end thereof distal said loading dock, said ramp being movable between a pendant stored position and an operative position substantially parallel to said platform, wherein the improvement comprises:

(a) a barrier means, movable between a raised and lowered position, for preventing movement of a wheeled apparatus across said platform when in said raised position or for allowing such movement across said platform when in said lowered position, said barrier means being hingedly attached to said platform and spaced from said end of said platform defining a door receiving region therebetween, such that said overhead door abuts said door receiving region of said platform when said door is closed; and (b) means, operatively attached to said barrier means, for controlling the raising and lowering of said barrier means responsive to the positions of said platform and ramp.

19. The improvement as defined in claim 18 wherein said controlling means comprises:

(a) a first crank arm, having a first end and a second end, said first end being rigidly connected to said ramp at an end thereof proximal said platform;

(b) a first elongated link, having a first end and a second end, said first end being pivotally attached to said second end of said first crank arm, said second end defining a slot positioned along the longitudinal axis of said first link;

(c) a second elongated link, having a first end and a second end, said second link further having a pin affixed thereto proximal said first end, said first end being hingedly attached to said platform, and said pin protruding through said slot of said first link, forming a slidable connection between said first link and said second link;

(d) a third elongated link having a first end and a second end, said first end being pivotally attached to said second end of said second link; and (e) a second crank arm, having a first end and a second end, said first end being pivotally attached to said second end of said third link, and said second end being rigidly connected to said barrier means.

20. An improvement for a dock leveler assembly to be used with a loading dock wherein said dock leveler assembly includes a platform affixed to said loading dock and movable to preselected heights and a ramp hingedly affixed to said platform at an end thereof distal said loading dock, said ramp being movable between a pendant stored position and an operative position substantially parallel to said platform, defining a variable angle between said ramp and said platform, wherein the improvement comprises:

(a) barrier means comprising a plate, movable between a raised and lowered position, for preventing movement of a wheeled apparatus across said platform when in said raised position or for allowing such movement across said platform when in said lowered position;

(b) a hinge, connected to and between said plate and said platform, to allow movement of said plate;

(c) a plurality of linking members which actuate said barrier means responsive to the position of said ramp comprising:

(i) a first crank arm, having a first end and a second end, said first end being rigidly connected to said ramp;

(ii) a first link, having a first end and a second end, said first end being attached to said second end of said first crank arm, said second end defining a slot;

(iii) a second link, having a first end and a second end, said second link further having a pin affixed thereto proximal said first end, said first end being hingedly attached to said platform, and said pin protruding through said slot of said first link, forming a slidable connection between said first link and said second link;

(iv) a third link having a first end and a second end, said first end being pivotally attached to said second end of said second link; and (v) a second crank arm, having a first end and a second end, said first end being pivotally attached to said second end of said third link, and said second end being rigidly connected to said plate, said link members cooperating such that the position of said barrier means is dependent upon the angle between said ramp and said platform.

* * * * *